June 30, 1931. B. DREW 1,812,739
FERTILIZER DISTRIBUTOR
Filed Nov. 21, 1928   2 Sheets-Sheet 1
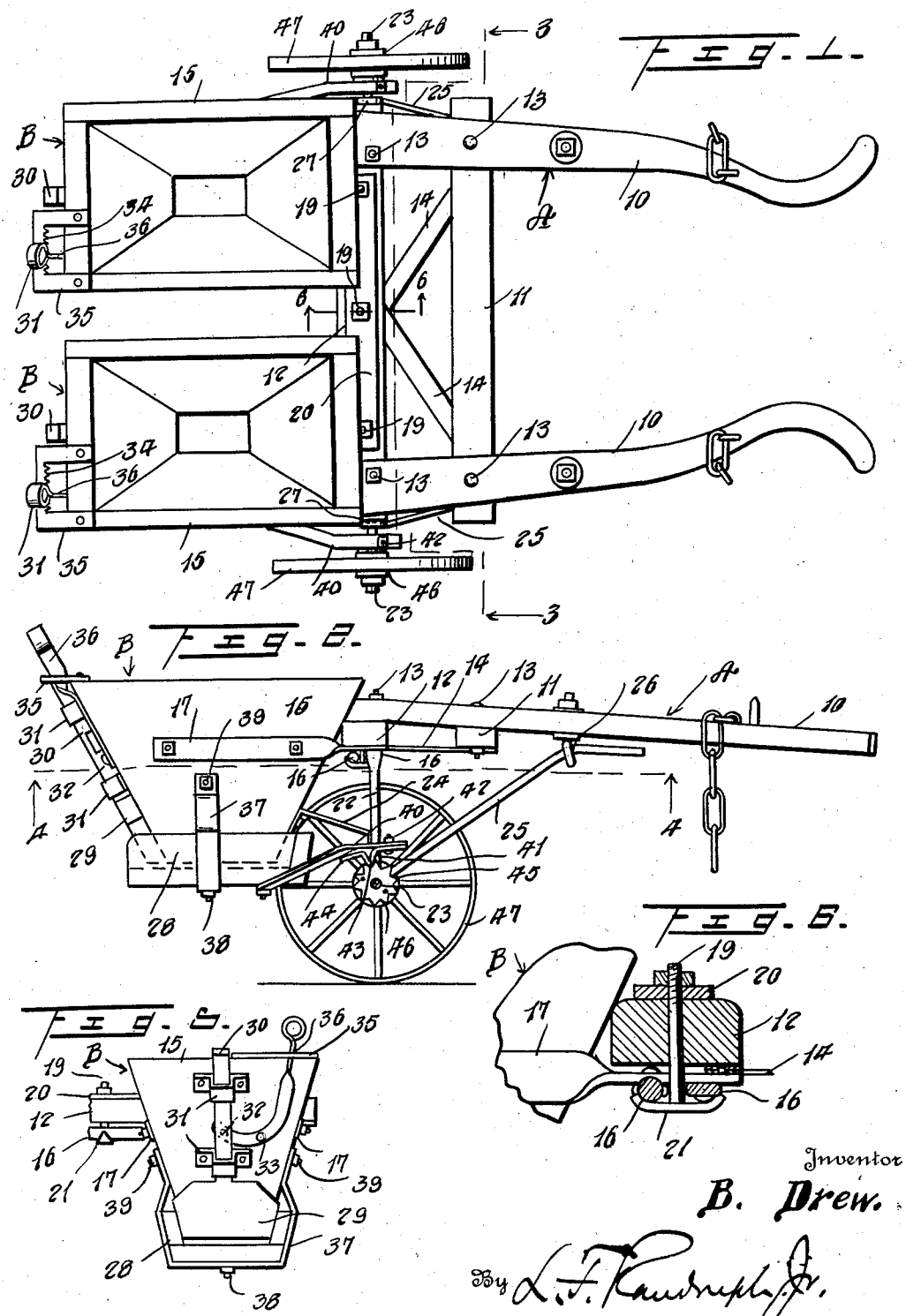
Inventor
B. Drew.
By L. F. Randolph, Jr.
Attorney

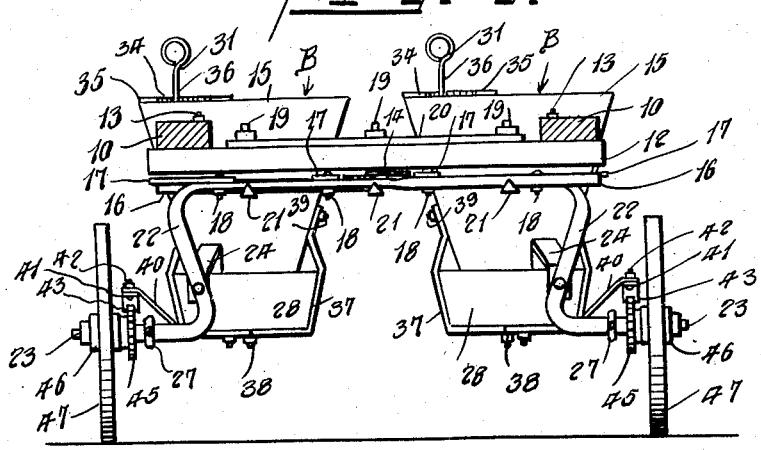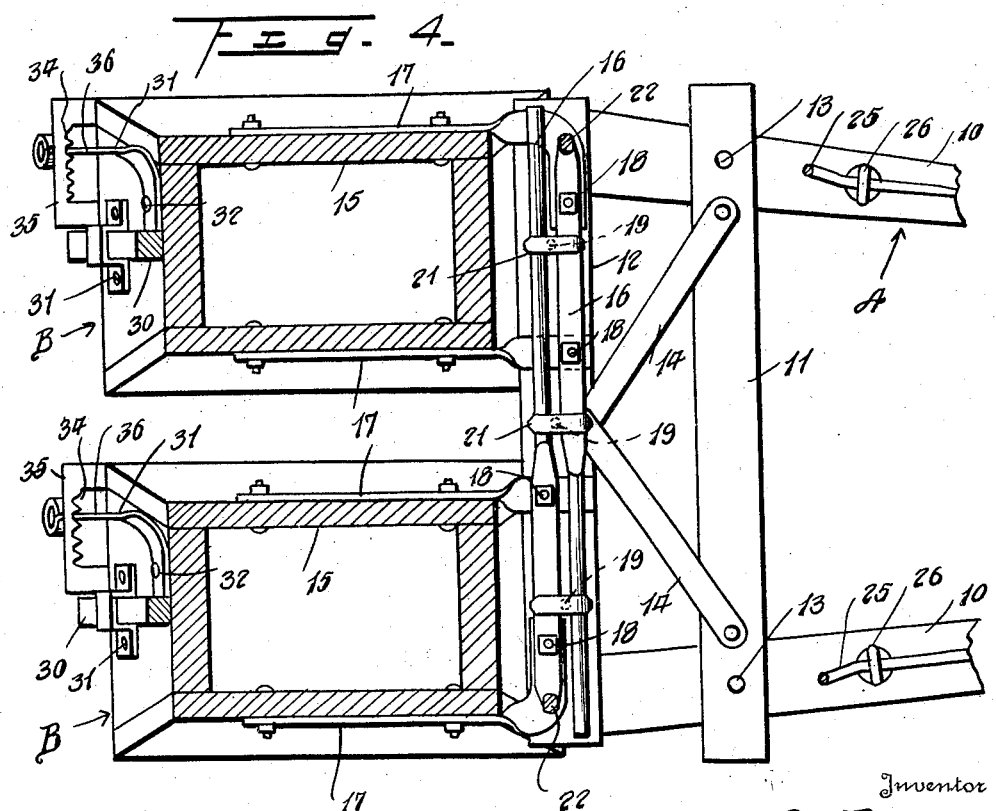

Patented June 30, 1931

1,812,739

UNITED STATES PATENT OFFICE

BEN DREW, OF IVOR, VIRGINIA

FERTILIZER DISTRIBUTOR

Application filed November 21, 1928. Serial No. 320,954.

This invention relates to a fertilizer distributor.

It is aimed to provide a novel construction employing a plurality of hoppers which may be moved to position them at various distances apart and individually relative to the center of the machine as desired.

Another important object is to provide a construction in which each hopper is provided with a mounting member having a wheel and which members are adapted to be adjustably connected together.

A further object is to provide a novel construction wherein novel ratchet springs are associated with agitating members so as to agitate the members when the machine is advancing and to avoid operation when the machine is backing.

Various additional objects and advantages will become apparent from a consideration of the description following taken in connection with accompanying drawings illustrating an operative embodiment.

In said drawings:—

Figure 1 is a view of the machine in plan,

Figure 2 is a side elevation thereof,

Figure 3 is a sectional view taken on the line 3—3 of Figure 1,

Figure 4 is a sectional view taken on the line 4—4 of Figure 2,

Figure 5 is a fragmentary rear elevation particularly showing one of the hoppers and its outlet valve or gate, and Figure 6 is a cross sectional view taken on the line 6—6 of Figure 1.

Referring specifically to the drawings, a suitable draft or hitching frame is shown at A which may comprise shafts 10 connected by forward and rear bars or trees 11 and 12, respectively fastened thereto as by means of bolts 13. Braces 14 disposed at an angle to each other may be secured to the trees 11 and 12 as shown.

The remainder of the machine in effect constitutes two units B.

Each unit B consists of a suitably shaped hopper 15 adapted to contain fertilizer or material to be distributed. Associated with each hopper 15 is a securing bar or member 16 which is disposed against the under surface of the tree 12.

Fastened to each side of each hopper 15 are supporting bars 17. Both bars 17 of one of the hoppers are bolted or rigidly fastened as at 18 to the same securing bars 16 and the bars 17 of the other hopper are bolted by bolts 18 to the other securing bar. The bars 16 are arranged in parallelism against the lower surface of the tree 12 and may be arranged with the hoppers 15 any desired distance part and are fastened in their different or adjusted positions by means of bolts 19 passing through the tree 12 and a metallic reenforcing plate 20 on the top of the tree 12. Said bolts 19 have heads at 21 overlapping both bars 16.

Each securing bar 16 has an end bracket portion 22, such portions being arranged at opposite sides of the machine and terminating in an axle 23. Braces 24 are connected to the hoppers and to the bracket portions 22 and additional braces 25 extend through eye bolts 26 carried by the shafts 10 and have portions 27 surrounding the brackets 22 and permitting lateral adjustment of such brackets therethrough.

A distributing shoe 28 is located below the open end of each hopper 15 so as to receive material therefrom under control of vertically adjustable valves or gates 29 located at the rear of each hopper. Such gates 29 have rods 30 slidably mounted through keepers 31 secured to the hoppers and to which rods 30, adjusting levers 31 are pivoted as at 32 and being pivoted in turn at 33 to the hoppers. Such levers 31 may be secured in different adjusted positions and accordingly secure the gates 29 at different adjustments through coaction with rachet teeth 34 of brackets 35 fastened to the hoppers, it being understood that the upper or handle portion 36 of such hook levers 31 are resilient so as to be capable of engaging and disengaging the teeth 34.

The shoes 28 are open at the rear and have side and a front end wall and are bolted to saddles 37 at 38 and which saddles at 39 are pivotally connected to side walls of the hoppers.

Extending forwardly from each shoe 28 is a rigid trip arm 40. Each trip arm 40 carries a spring pawl 41 fastened thereto as at 42 and having a depending lug 43 and a rear end 44 in spaced relation to the arm 40. The trip arm 40 is resilient.

Coacting with the trip arm 41 are ratchet or star wheels 45 rigid on hubs 46 of ground wheels 47 which are journaled on the axles 23.

As a result, it will be realized that each unit B consists of a hopper connected to a rod 16 by means of which it is adjustably secured to the frame A and that each attaching bar 16 by reason of the fact that it has a bracket 22 integral therewith, mounts one of the wheels 47. The units also mount and control one of the shoes 28 and its operating mechanism consisting of a wheel 45 trip means 40—41. Thus when the hoppers are arranged at different distances apart, the wheels 47 are accordingly arranged at different distances apart. The machine accordingly is made up of the units B adjustably connected to the unit A.

As the machine advances, the lug 43 by its intermittent engagement by each of wheels 45 vibrates the shoes 28 to effect the discharge of the fertilizer or other material, to an extent controlled by the adjustment of gates 29. Should the machine back, due to the fact that the trip of the spring arms 41 and their rear ends 44 are spaced from the arms 40, trip arm 41 will yield upwardly at the free ends 44 so as to avoid operation of the shoes.

Various changes may be resorted to provided they fall within the spirit and scope of the invention.

I claim as my invention:—

1. A machine of the class described comprising a hitching frame, attaching bars disposable in parallelism against the under surface of the frame, means adjustably securing said bars to the frame, said bars having depending bracket portions integral therewith and terminating at opposite ends in axles, ground wheels mounted on said axles and adjustable therewith, a hopper attached to each bar, a distributing shoe carried by each hopper, a trip arm extending from each hopper, a trip wheel coacting with said trip arm and driven by each ground wheel.

2. A machine of the class described comprising a hitching frame, attaching bars having transverse portions in substantial parallelism, means adjustably securing said portions to the frame, rearwardly extending supporting bars secured to said attaching bars, hoppers to which said supporting bars are attached, bracket portions integral with and depending from the first mentioned portions, axles integral with the bracket portions and extending outwardly from the lower ends thereof, a distributing shoe at the lower end of each hopper carried by the hopper, wheels on said axles, means to actuate the distributing shoes through movement of the wheels, and brace means for said hoppers secured to said bracket portions.

In testimony whereof I affix my signature.

BEN X DREW.
his mark